C. A. EVANS.
EDUCATIONAL DEVICE.
APPLICATION FILED APR. 23, 1913.
1,100,363.
Patented June 16, 1914.
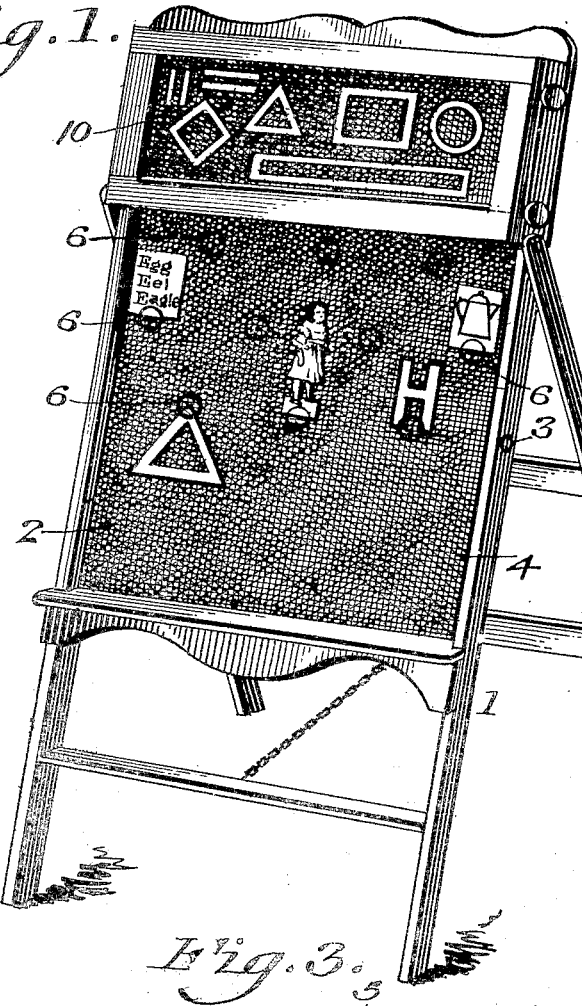
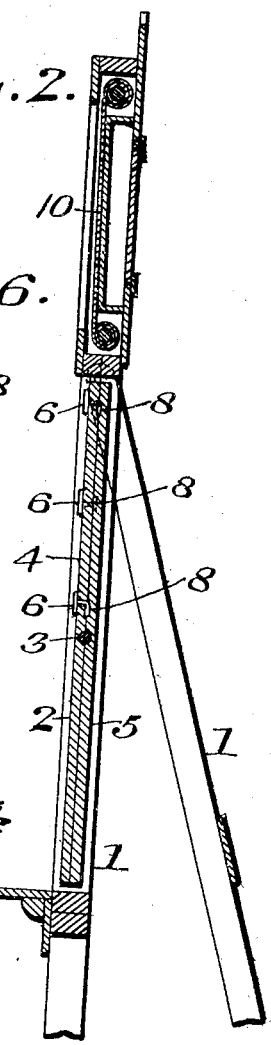
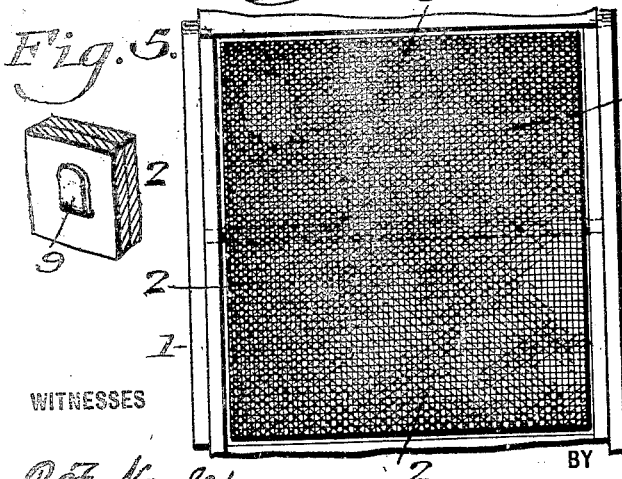
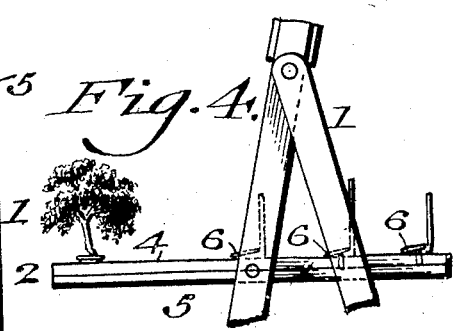
WITNESSES
INVENTOR
Clarence A. Evans.
BY
ATTORNEYS

UNITED STATES PATENT OFFICE.

CLARENCE A. EVANS, OF CHESTER, PENNSYLVANIA.

EDUCATIONAL DEVICE.

1,100,362.  Specification of Letters Patent.  Patented June 16, 1914.

Application filed April 23, 1913. Serial No. 762,999.

*To all whom it may concern:*

Be it known that I, CLARENCE A. EVANS, a citizen of the United States, residing at Chester, in the county of Delaware, State of Pennsylvania, have invented a new and useful Educational Device, of which the following is a specification.

My invention consists of an educational device embodying a black-board, and means thereon for removably affixing pictures, emblems, and representations of other objects thereto.

It consists also in forming the blackboard with double faces, and supporting the board, whereby either face may be presented for use, and in adapting the board to be placed in vertical and horizontal positions while firmly holding said pictures, emblems, and representations thereon.

The invention is satisfactorily illustrated in the accompanying drawing, but the important instrumentalities thereof may be varied, and so it is to be understood that the invention is not limited to the specific arrangement and organization shown and described.

Figure 1 represents a perspective view of an educational device embodying my invention. Fig. 2 represents a vertical section of a portion of the same on an enlarged scale. Fig. 3 represents a view of a portion of the device on a side opposite to that shown in Fig. 1. Fig. 4 represents a side elevation of the black-board and the supporting frame or easel therefor, the black-board being in horizontal position. Fig. 5 represents a perspective view of the affixing device employed as removed from the black-board. Fig. 6 represents a perspective view of another form of such affixing device.

Similar numerals of reference indicate corresponding parts in the figures.

Referring to the drawings:—

1 designates a frame of the form of an easel, and 2 designates a board known by the conventional name of a black-board which is connected with the front member thereof by the pivots or journals 3, whereby said board may be rotated on said pivots or journals as an axis and so placed in upright and horizontal positions according to requirements. it being noticed that the blackboard is composed of a plurality of members so as to present two faces 4 and 5.

On the face 4 is a series of clips 6 composed of wire ring-like bodies or heads 7 with shanks 8 thereon, the latter being adapted to be passed through the front member of the black-board and clenched on the rear thereof, or between the two members, thus retaining the clips in place, but said clips may be formed of sheet metal bodies 9, as in Fig. 6, which are secured to the black-board in any suitable manner, it being noticed that the bodies project from the black-board so that they may be held freely therefrom, they being pliable or yielding in their nature whereby pictures, emblems, figures, or representations of other objects may be inserted between the heads of the clips and the face of the black-board and so supported on the latter whether the black-board is in upright position, as in Fig. 1, or in horizontal position, as in Fig. 4. In the latter case, said pictures, emblems, figures and representations have bases at an angle thereto, said bases being adapted to be inserted under the heads or bodies of the clips and thus retain the pictures, etc., upright as shown in said Fig. 4.

On the top of the frame or easel 1 is a chart 10 which may be of geometric figures, to which, however, I do not limit the invention, other figures may be placed on the chart and presented to view as desired, so that the attention of scholars may be directed thereto for purpose of educating the scholars to such extent and familiarize them with the names and characteristics of the figures. Then, scholars may be called upon to select pictures, emblems, letters of the alphabet, cards containing words thereon, or other objects and affix them to the blackboard and thus familiarize themselves with the same or the teacher may so select and apply such objects and instruct the scholars as to the nature of the same. Then, the portion of the black-board below the clips may be used for writing explanations, descriptions, lessons, etc., thereon, and the black-board may be turned so as to present the rear face 5 thereof to the front, as in Fig. 3, to be used as may be elected.

It is evident that the pictures, etc., may be placed on different portions of the blackboard to be retained by the clips thereon, and removed and stored-away as desired. As said clips are spread over the face of one member of the board, and their resilient heads are set-out from said face, a plurality of objects may be held on each of the same at their tops, bottoms and sides, by which provision also a design or scene may be built-up on said face, the various pictures, objects, etc., intended to produce the same being fitted to the differently located clips and adjusted on different parts of each of the same to produce the desired result, as such design or scene may require.

Having thus described my invention what I claim as new and desire to secure by Letters Patent, is:—

1. In an educational device, a board, and a clip on a face of said board adapted to hold a plurality of objects on said face, said clip being composed of a resilient head which is set out from said face, and a shank which is continuous of said head and permanently connected with said board.

2. In an educational device, a board, and a series of clips on the face of said board spread over the same, each being adapted to hold a plurality of objects on said face and composed of a resilient head which is set out from said face, and a shank which is continuous of said head and permanently connected with said board.

3. A two faced board composed of a plurality of connected members, and a clip on the face of one of said members, said clip being composed of a resilient head, and a shank continuous thereof, said head being set-out from said face, and said shank being permanently fastened to the board, its means of fastening being intermediate of said members.

CLARENCE A. EVANS.

Witnesses:
JOHN A. WIEDERSHEIM,
M. BUSSINGER.